United States Patent
Boutin et al.

(10) Patent No.: US 10,533,659 B2
(45) Date of Patent: Jan. 14, 2020

(54) HYDROSTATIC TRANSMISSION SYSTEM COMPRISING MEANS OF LIMITING ACCELERATION DURING A CHANGE OF DISPLACEMENT, CONTROL METHOD AND MACHINE SO EQUIPPED

(71) Applicant: POCLAIN HYDRAULICS INDUSTRIE, Verberie (FR)

(72) Inventors: Christelle Boutin, Verberie (FR); Sebastien Pamart, Verberie (FR); Stephane Chaperot, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 0 days.

(21) Appl. No.: 16/033,151

(22) Filed: Jul. 11, 2018

(65) Prior Publication Data

US 2019/0017595 A1 Jan. 17, 2019

(30) Foreign Application Priority Data

Jul. 12, 2017 (FR) ...................................... 17 56632

(51) Int. Cl.
*F16H 61/42* (2010.01)
*F16H 61/00* (2006.01)
*F16H 61/04* (2006.01)
*F16H 61/06* (2006.01)

(52) U.S. Cl.
CPC ......... *F16H 61/42* (2013.01); *F16H 61/0025* (2013.01); *F16H 61/0403* (2013.01); *F16H 61/065* (2013.01)

(58) Field of Classification Search
CPC ............. F16H 61/0025; F16H 61/0403; F16H 61/065; F16H 61/444; F16H 61/42; B60K 7/0015; B60K 17/356; B60K 23/0808
See application file for complete search history.

(56) References Cited

U.S. PATENT DOCUMENTS

| | | | |
|---|---|---|---|
| 3,827,239 A | 8/1974 | Ulrich | |
| 4,936,095 A * | 6/1990 | Ross | .................. F16H 39/14 60/444 |
| 5,101,925 A | 4/1992 | Walker | |
| 5,810,106 A * | 9/1998 | McCoy | .................. B60L 50/62 180/243 |
| 6,119,802 A * | 9/2000 | Puett, Jr. | ................ B60K 17/10 180/242 |

(Continued)

FOREIGN PATENT DOCUMENTS

EP 0993982 A1 4/2000

OTHER PUBLICATIONS

Preliminary Research Report received for French Application No. 1756632, dated Mar. 27, 2018, 2 pages (1 page of French Translation Cover Sheet and 1 page of original document).

*Primary Examiner* — Erez Gurari (74) *Attorney, Agent, or Firm* — Womble Bond Dickinson (US) LLP (57) ABSTRACT

The present invention relates to a hydrostatic transmission system comprising: at least one pump (110), at least two wheel motors (120, 122; 140, 142) supplied by the pump (110) for the mechanization of a machine, characterized by the fact that it comprises means (130) designed to offset in time a change of displacement of the motors (120, 122; 140, 142) into several groups so as to have a progressive evolution of the apparent displacement of the motors.

16 Claims, 11 Drawing Sheets

(56) References Cited

U.S. PATENT DOCUMENTS

| | | | |
|---|---|---|---|
| 2005/0241870 A1* | 11/2005 | Ohashi | B60K 7/0015 |
| | | | 180/242 |
| 2016/0169357 A1 | 6/2016 | Vallerant et al. | |
| 2016/0304116 A1* | 10/2016 | Magisson | B62D 11/003 |
| 2016/0341308 A1* | 11/2016 | Rathke | F16H 61/44 |
| 2018/0142782 A1* | 5/2018 | Lindinger | F16H 61/4017 |
| 2019/0017595 A1* | 1/2019 | Boutin | F16H 61/0025 |

* cited by examiner

HYDROSTATIC TRANSMISSION SYSTEM COMPRISING MEANS OF LIMITING ACCELERATION DURING A CHANGE OF DISPLACEMENT, CONTROL METHOD AND MACHINE SO EQUIPPED

The present invention applies particularly to wheel motors of the type with cams and radial pistons. Such motors with cams and radial pistons are well known in the prior art. The Poclain company in particular markets numerous motors of this type. These motors will therefore not be described in detail hereafter. However, the general structure of such motors with cams and radial pistons will be recalled in reference to the appended FIGS. 10 and 11.

Hydraulic motors with cams and radial pistons are generally fixed-displacement motors.

However, certain hydraulic motors are constituted from several sub-motors.

It is thus possible to supply one or more sub-motors, which allows different displacements to be obtained.

A large displacement of the motors creates torque and a small displacement creates speed.

The commutation from one supply mode to another, by displacement, can be accomplished when stopped or while rolling.

When the commutation of a motor 20, 22 is accomplished while rolling, an acceleration (positive, negative, positive then negative or negative then positive; a negative acceleration corresponding to a deceleration) can be felt.

Figure 1:
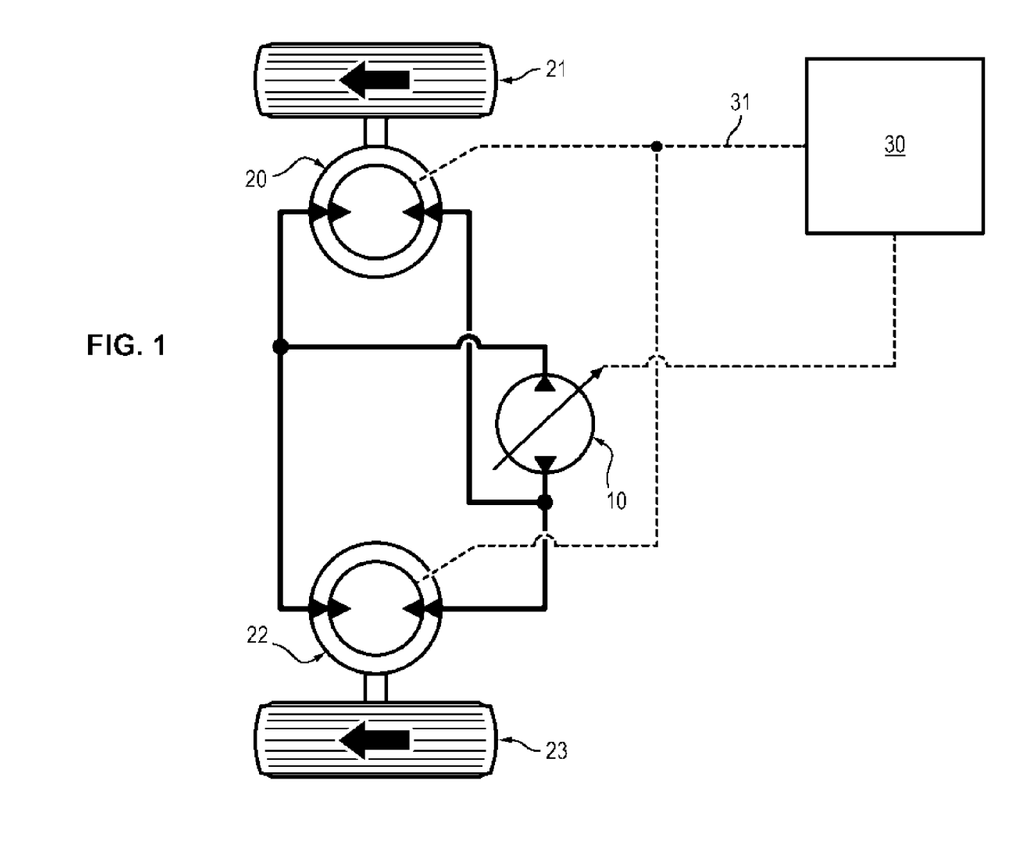
FIG. 1, previously described, shows the general structure of a hydrostatic transmission comprising a pump and two wheel motors known in the prior art, FIGS. 2*a*, 2*b* and 2*c* previously described, illustrate respectively the variation in displacement of the pump, the variation in displacement of the motors and the variation in speed of a machine thus equipped with the circuit shown in FIG. 1 known from the prior art.
Figures 2A, 2B:
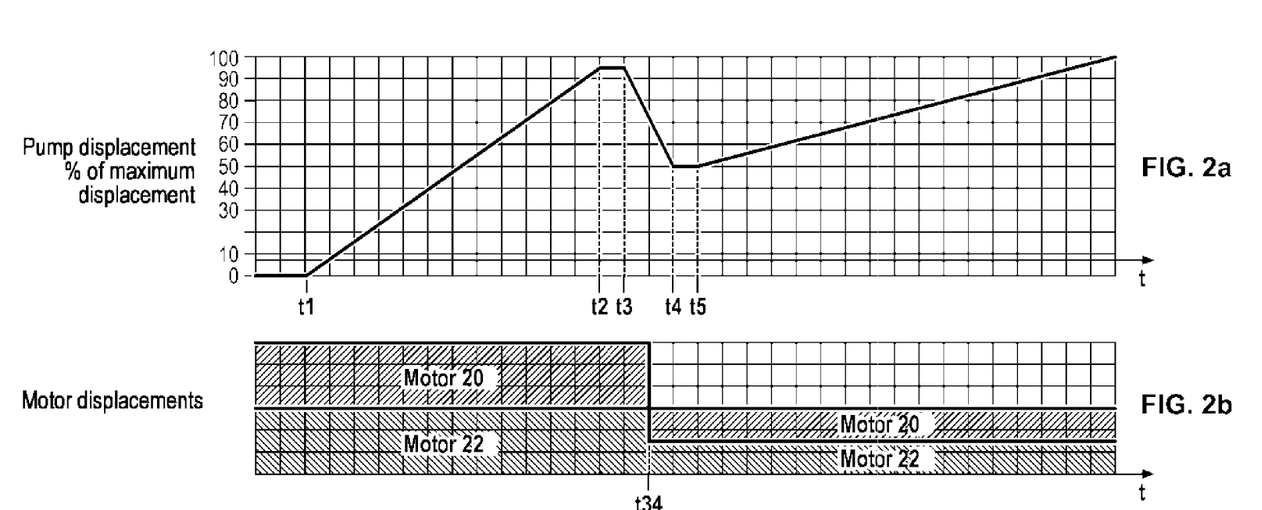
Figure 2C:
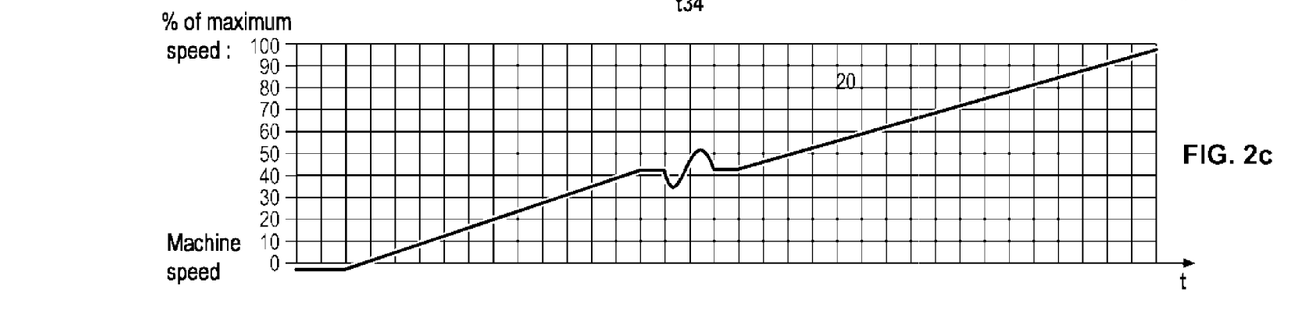

In the prior art, it is known to attempt to reduce this acceleration by synchronizing the changing of the supply mode of the motors with an incremental displacement increase of the pump as illustrated in FIGS. 2a, 2b and 2c.

FIG. 2a shows a variation of displacement of the pump 10 as a function of time. In FIG. 2a, a known increase in the displacement of the pump 10 is observed between instants t1 and t2, a stable displacement between instants t2 and t3, a decrease in displacement between instants t3 and t4, a stability of displacement between instants t4 and t5, then a new progression of displacement with a shallower slope than between instants t1 and t2.

FIG. 2b shows the respective displacements of the motors 20, 22, i.e. the volume of oil consumed by each of the motors 20, 22.

A reduction of half the displacement of each motor 20 and 22 is observed at the instant t34 comprised between instants t3 and t4.

FIG. 2c shows the variation in speed of the machine as a function of time. FIG. 2c illustrates the variations in speed and the induced accelerations/decelerations between the instants t2 to t5, more particularly between t3 and t4.

The aim of the present invention is now to reduce the accelerations and decelerations during the change in the supply mode of the motors, that is when the displacement of the motors 20, 22 of a machine is changed.

The aforementioned aims are attained within the scope of the present invention thanks to a hydrostatic transmission system comprising:
  at least one pump,
  at least two wheel motors supplied by the pump for the mechanization of a machine,
characterized by the fact that it comprises a control system designed to offset in time a change of displacement of the motors into several groups in order to have a progressive change in the apparent displacement of the motors, to avoid commuting two motors having received a change command at the same time.

According to another advantageous characteristics of the invention:
  the control system designed to offset in time a change of displacement of the motors into several groups so as to obtain a progressive change in the apparent displacement of the motors, controls the changing of the displacement of the motors during the time when the displacement of the pump is changed,
  the decomposition of the displacement changes of the motors is accomplished by a change of displacement of the motor situated on one side of the machine, then by a change of displacement of the motor situated on the other side of the machine,
  each group of motors comprises a single motor,
  each group of motors comprises several motors,
  when a change of speed or of torque is required on a machine, requiring a change of the total displacement of the circuit, over at least two multi-cylinder motors, the change of motor displacement is echeloned over a time interval T,
  the cylinder control system conforming to the invention is designed to define an intermediate displacement of the circuit by controlling, in a manner differentiated in time, at least two selector spools (for displacement or short-circuit),
  the time interval T over which the offset in the displacement change of the motors is echeloned corresponds, at a minimum, to the time required for the pump, and preferably also the motors, to carry out the corresponding change of displacement depending on their reaction rate,
  the time interval over which the change of displacement of the motors is accomplished is included in the time necessary for the pump to accomplish the corresponding change of displacement depending on its reaction rate.
  the decomposition of the change of displacement of the motors into several groups, in order to have a progressive apparent change of displacement of the motors, is designed to approximate the evolution of the pump displacement during its jump in displacement,
  the time intervals T over which the offset in the displacement change of the motors is echeloned correspond, at a minimum, to the time necessary for the control spools of the motor, depending on their reaction rate,
  the time interval T between two changes in displacement of the motors is at least the necessary time, and substantially on the order of magnitude of the necessary time (for example from 1 to 3 times), for the pump (or for the motors) for a change of displacement due to the change of a single motor (or a single group of motors) (from the intermediate offset),
  Within the scope of the invention, the motors are preferably motors with cams and radial pistons.

The invention also proposes a method for controlling the displacement of a wheel motor implementing the aforementioned system and which comprises the steps consisting of offsetting in time a change of displacement of the motors into several groups in order to have a progressive change in the apparent displacement of the motors.

Preferably, the method conforming to the present invention also comprises the steps consisting of beginning the change of displacement of the pump, offsetting in time a change of displacement of motors into several groups so as to have a progressive evolution of the apparent displacement of the motors, then finishing the change of displacement of the pump corresponding to the new displacement of the motors.

The invention also relates to vehicles or machines including the hydrostatic transmission system of the aforementioned type and/or implementing the aforementioned motor displacement control method.

Other features, aims and advantages of the present invention will appear upon reading the detailed description that follows and with reference to the appended drawings, given by way of non-limiting examples and in which:

FIGS. 6 and 7 show schematically two operational flow charts of a hydrostatic system conforming to the present invention, FIG. 8 takes up again the circuit of FIG. 3 by illustrating schematically the general structure of multiple-displacement motors associated with displacement change selector spools, FIG. 9 takes up again the circuit of FIG. 5 by illustrating schematically the general structure of multiple-displacement motors associated with displacement change selector spools.

Figure 3:
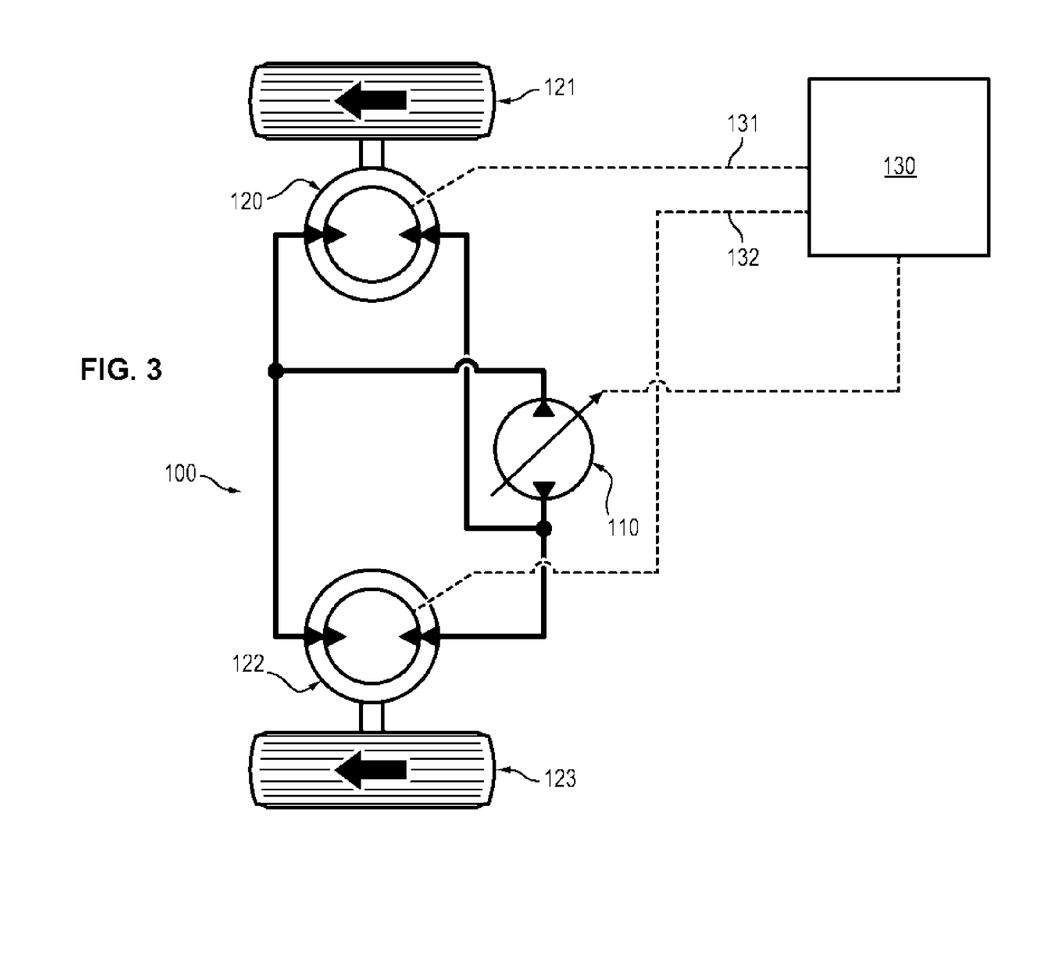
FIG. 3 shows a schematic view of a circuit conforming to the present invention.

Represented schematically in the appended FIG. 3 is a hydrostatic transmission system 100 conforming to the present invention comprising a pump 110 and two wheel-motors 120, 122 associated respectively with the right 121 and left 123 wheels and supplied by the pump 110 for the mechanization of a machine.

The pump 110 is preferably actuated by a heat engine, not illustrated in FIG. 3 to simplify the illustration.

The change of displacement of the pump 110 and of the wheel motors 120, 122 is controlled by a control module 130.

As previously indicated, the module 130 is designed to offset in time a change of displacement of the motors 120, 122 into several groups, two groups formed respectively of the left motor 123 and the right motor 121 in this particular case, so as to have a progressive change in the apparent displacement of the motors.

More precisely, the module 130 is preferably designed to offset in time the change of displacement of the motors 120, 122 so that the progressive change in the apparent displacement of the motors is as close as possible to the variation of displacement of the pump 110 during its jump of displacement.

As can be seen in FIG. 3, to this end the displacements of the motors 120, 122 are controlled by different outputs 131, 132 of the control module 130.

Figure 4A:
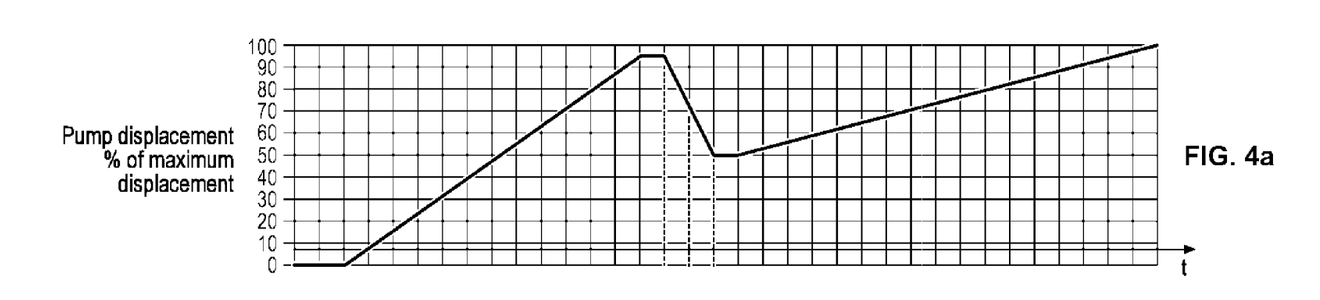
FIGS. 4*a*, 4*b* and 4*c* show respectively the variation of displacement of the pump, the variation of displacement of the motors and the variation of speed of the machine equipped with a circuit conforming to FIG. 3.
Figures 4B, 4C:
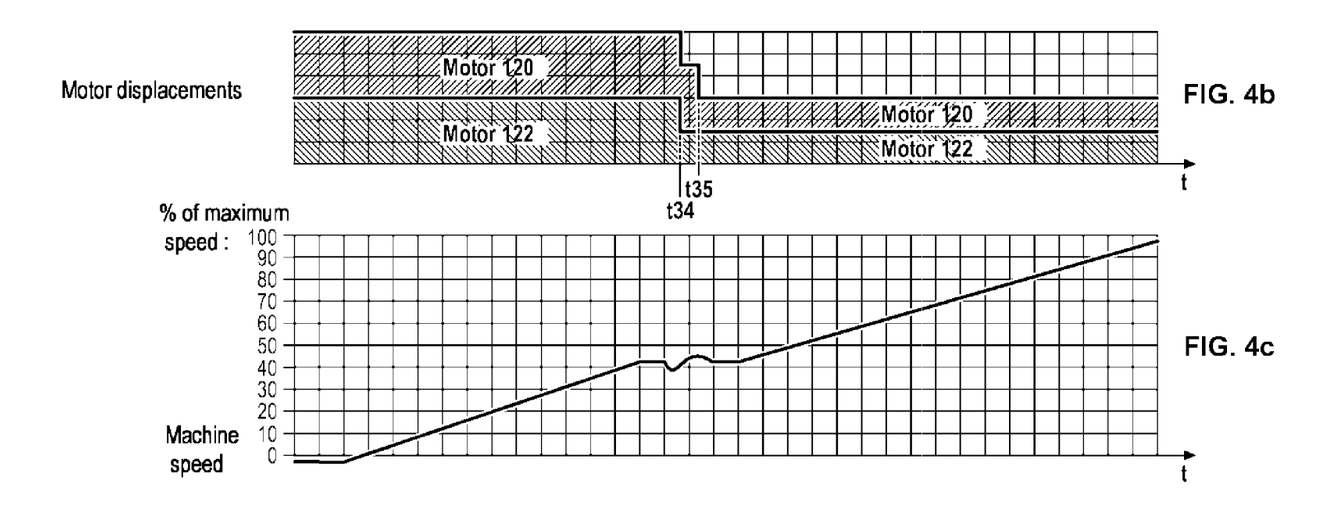

The advantages of the invention will result from the examination of FIGS. 4*a*, 4*b* and 4*c* in comparison with homologous FIGS. 2*a*, 2*b* and 2*c* resulting from the prior art.

The comparative examination of FIGS. 2*c* and 4*c* shows in fact that the variation of speed of the machine, illustrated in FIG. 4*c*, within the scope of the invention is much less subject to changes, notable accelerations and decelerations than in machines conforming to the prior art, as illustrated in FIG. 2*c*.

This is due to the fact that, as illustrated in FIG. 4*b*, the change of displacement of the motors 120 and 122 is offset in time.

The reduction in displacement of the motor 122 is accomplished at instant t34 in FIG. 4*b*, while the change of displacement of the motor 120 is accomplished at instant t35 in FIG. 4*b*.

During the change of displacement of the motors 120, 122, there is an adjustment of the displacement of the pump 110, to obtain continuity of speed.

The change of displacement of the pump 110 is rather slow. The time offset of the change of displacement of the motors 120, 122, much more rapid, during the adjustment movement of the displacement of the pump 110, by avoiding commuting both wheel motors 120, 122 at the same time, and on the contrary offsetting their change of displacement in time at the same time, allows smoothing the speed as illustrated in FIG. 4*b*.

Without the implementation of the invention, a sudden change of displacement of the motors, concomitant with an adjustment of displacement of the pump, produces strong shocks, as illustrated in FIG. 2*b*.

On the contrary, the invention allows these shocks to be avoided as illustrated in future 4*b*.

During a change of displacement on one axle, if the two motors 120, 122 change their displacement at the same time according to the prior art, the vehicle undergoes unintentional braking and acceleration.

To smooth these disadvantages, the present invention therefore accomplishes a time offset of the displacement change of the motors. The time offset corresponds to the time necessary for the adjustment of the displacement of the pump.

Figure 8:
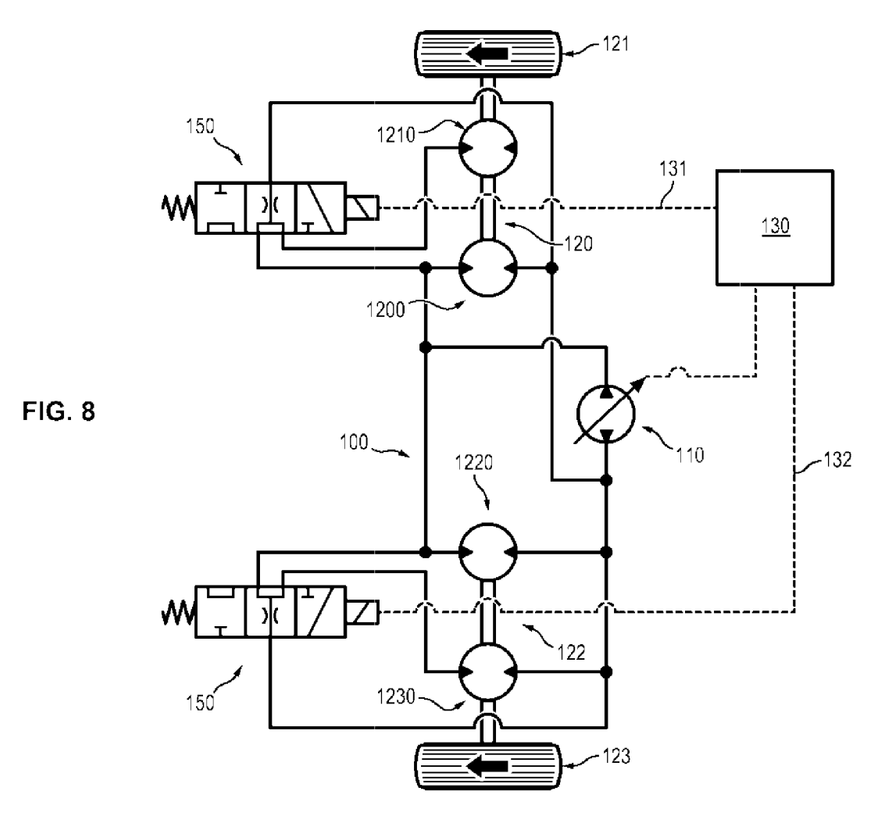

This solution imposes having one solenoid control valve per motor or group of motors, as shown schematically in FIG. 8.

When rolling, the computer follows the driver's demands, in particular for controlling the pump 110, and achieving the set speed, acceleration or deceleration demanded.

Upon changing the displacement of the motors 120, 122, the computer carries out the method autonomously, by controlling the pump 110 and by triggering the change of displacement of the motors 120, 122, then resumes following the demands of the driver.

Figure 5:
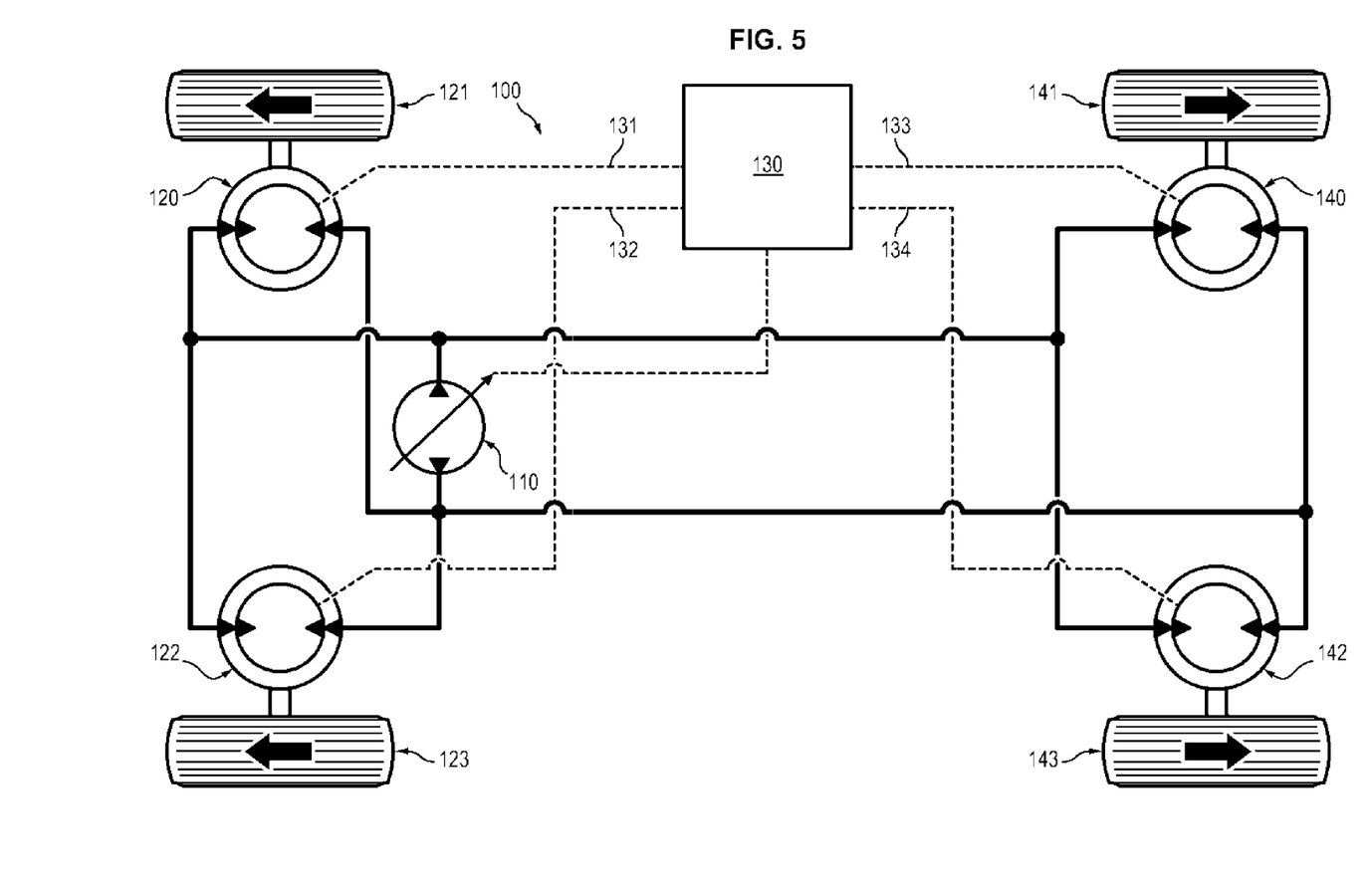
FIG. 5 shows a variant embodiment of a circuit conforming to the present invention, comprising four wheel motors.

The invention also applies, as illustrated in FIG. 5, in the case of a hydrostatic transmission system for which each group of motors comprises several motors, for example each group of motors comprising two motors.

Illustrated as a matter of fact in FIG. 5 is a hydrostatic transmission system conforming to a variant of the invention comprising two axles, respective front and rear: a front axle comprising a front wheel 121 associated with a wheel motor 120 and a left wheel 123 associated with a wheel motor 122, and a rear axle comprising a right wheel motor 140 associated with a right wheel 141 and a left wheel motor 142 associated with a wheel 143.

The pump 110, which feeds the four motors 120, 122 and 140, 142 is controlled in displacement, as well as the motors 120, 122, 140 and 142, by a control module 130 having the same functions as the module described previously with reference to FIG. 3.

The groups of motors according to FIG. 4 can be composed, either for one of the right wheel motors 120 and 140 and for the other of the two left wheel motors 122, 142 or as a variant for one of a left motor and a right motor and for the other of the two complementary motors.

According to the illustration given in FIG. 5, the displacements of the motors 120, 122, 140, 142 are controlled by different outputs 131, 132, 133 and 134 of the control module 130. As a variant, it is possible to provide outputs of the control module 130 common to the motors of the same group.

The optimization in time of the change of displacement of the left and right motors or of any other group of motors, within the scope of the invention, can also allow compensation for a difference in reactivity due to asymmetrical piping in the lines connecting the pump 110 to the different motors.

Compared to the prior art, the present invention offers in particular the following advantages:
- better comfort for passengers,
- a better quality process, avoiding for example generating fore and aft oscillations of the ramps of a sprayer in a field.
- improvement of sensation during a change of displacement (rise or fall) by changing the displacement of a motor (or of a group of motors), then of another motor (or of another group of motors). The invention thus allows providing more regular accelerations and therefore more comfort and regularity in the process applied by the machine.

The present invention can be applied to the transmissions of numerous types of machines, evidently preferably to rolling machines, such as sprayers, personnel transports, sweepers, tractors, or any rotating machines with high inertia.

Figure 6:
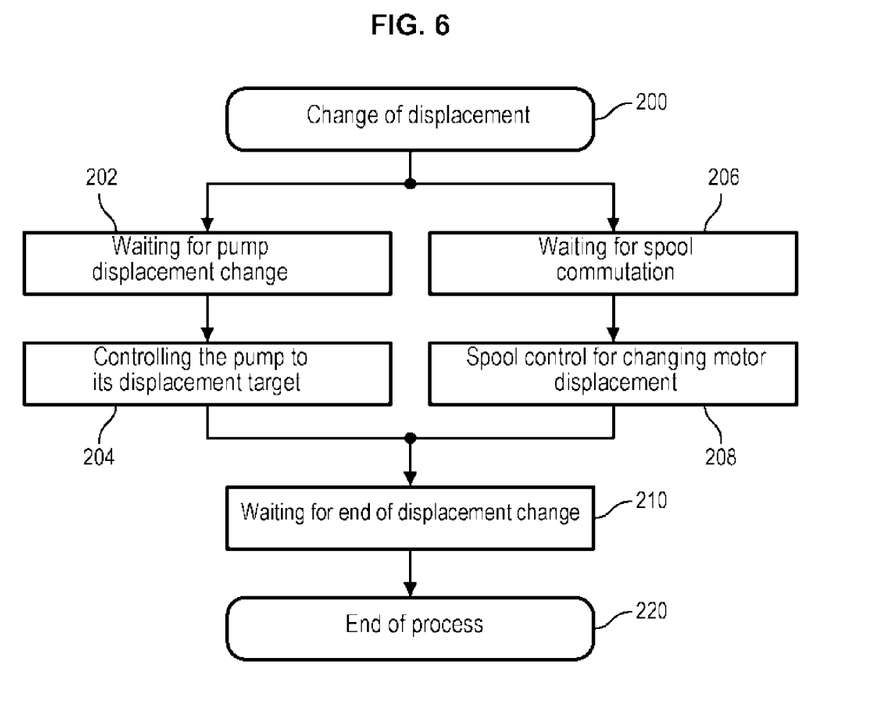

FIG. 6 illustrates schematically the main steps in a method of motor management conforming to the present invention.

Shown in FIG. 6 is an initial step 200 which corresponds to a displacement change demand.

Step 200 is followed by a step 202 consisting of putting the change of displacement of the pump 110 on hold for a predefined period depending on the characteristics of the system. The step 202 is followed by a step 204 of controlling the pump 110 so that it reaches its target displacement.

In parallel with steps 202 and 204, after the initial step 200, the process implements a step 206 of placing the change of position of a spool controlling the displacement change of the motors on hold for a predefined period depending on the characteristics of the system, then a step 208 consisting of commutation of the motor displacement control spool so that they reach their target displacement.

The steps 204 and 208 are followed by a step 210 consisting of detection of the correct accomplishment of the demanded displacement change.

The final step in the process, when the change of displacement is accomplished, is labeled 220.

Figure 7:
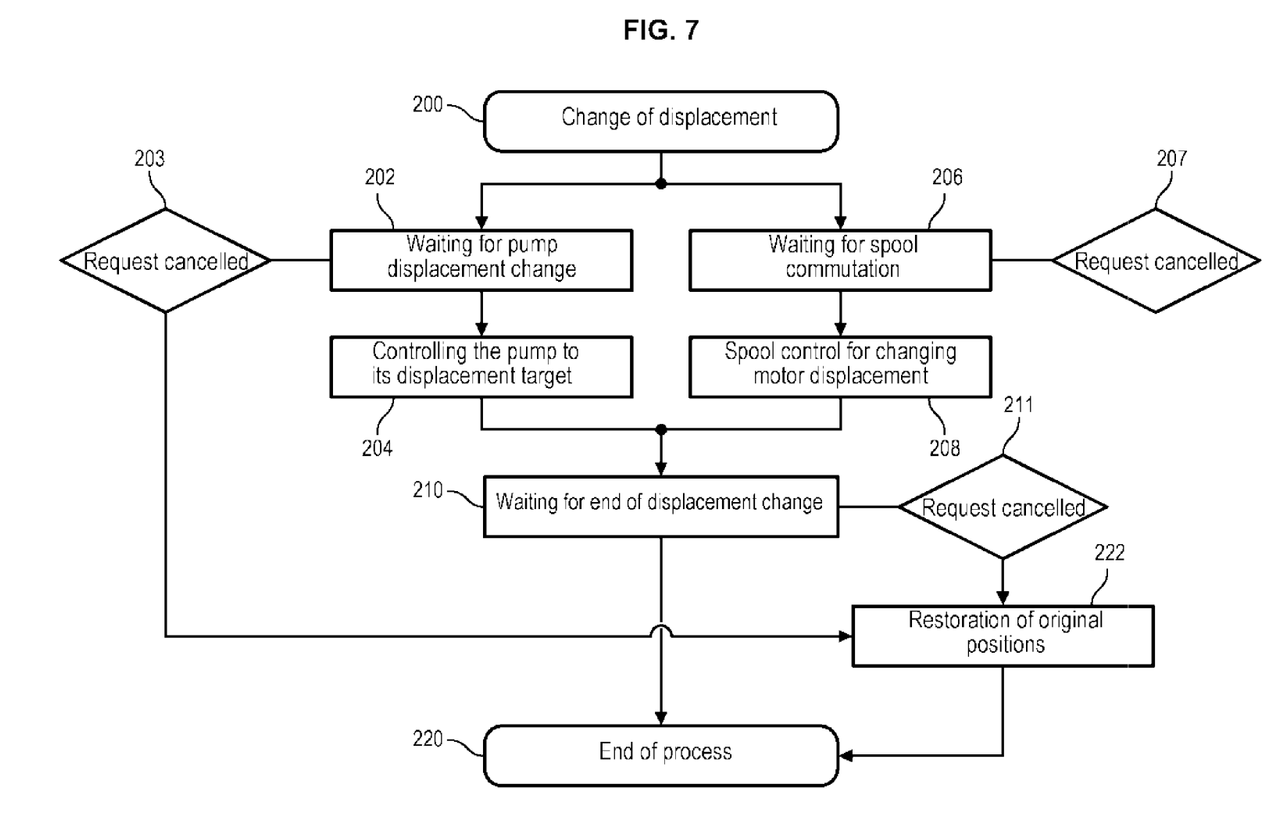

FIG. 7 illustrates a variant of the motor management method conforming to the present invention according to which the steps 202, 206 and 210 are associated with steps 203, 207 and 211 of detecting a cancellation demand for the displacement change, followed in the event of such a detection with a step 222 of restoring the original positions of the pump, of the motor displacement control spool and consequently of the associated motors.

Figure 9:
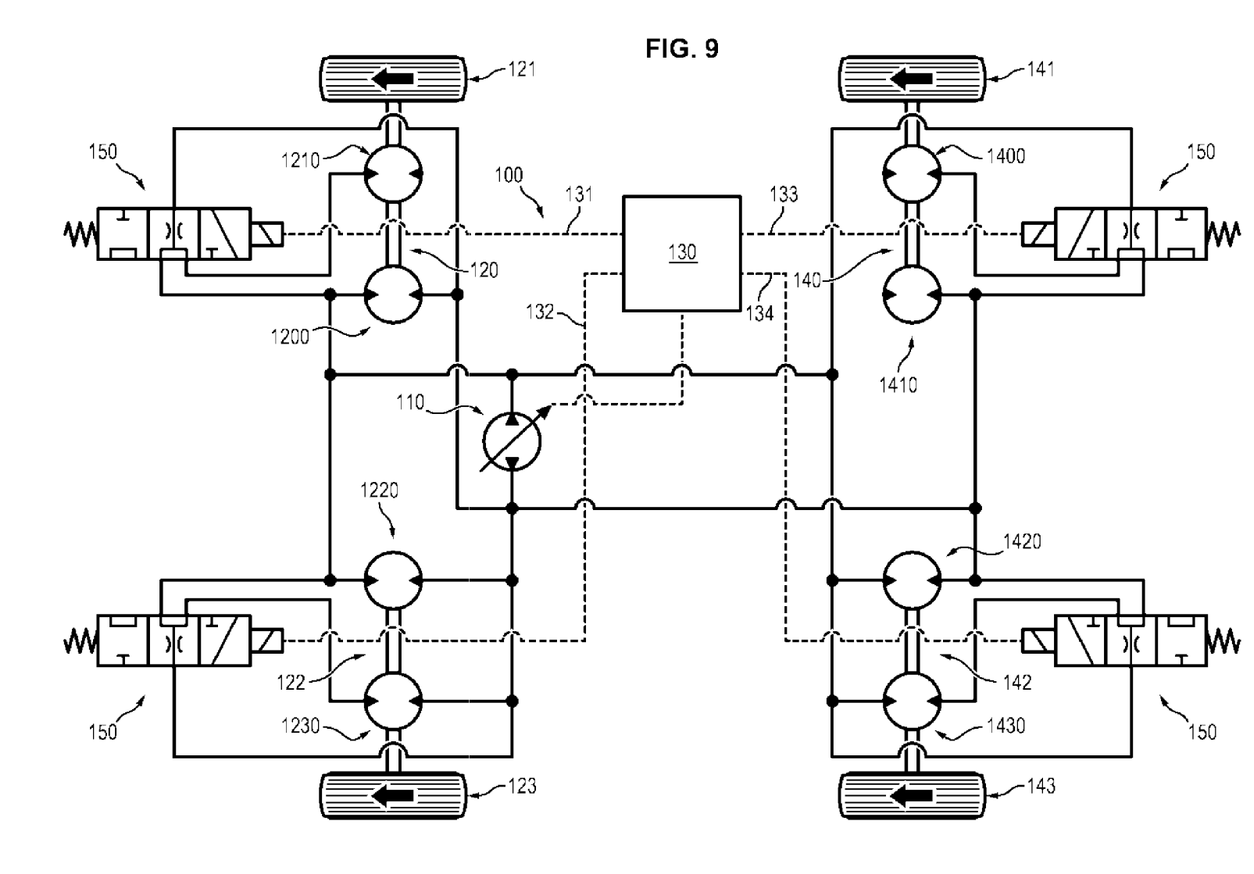

Shown schematically in the appended FIGS. 8 and 9 are exemplary embodiments of multi-cylinder motors 120, 122, 140, 142 controlled in known fashion by respective displacement selector spools 150 (hydraulic spools for changing displacement). The motors 120, 122, 140, 142 illustrated in FIGS. 8 and 9 include two displacements 1200, 1210; 1220, 1230; 1400, 1410; 1420, 1430 coupled to common wheel shafts. The selectors 150 can be integrated into the motors 120, 122, 140, 142. They can be controlled electrically or hydraulically.

The selectors 150 illustrated in FIGS. 8 and 9 have three positions. The central position is an ephemeral or transitional position between two stable states. This central position, which is only an intermediate comfort step, can however be eliminated.

The intermediate step, if its calibrated differently per motor, can allow an offset in the change of displacement per motor, for a single command.

As a variant without an intermediate step, a different calibration of the return spring, or a different calibration of the control orifice, or of the drain orifice (not shown) of the selector spool 150, or the addition of a damping chamber on a port associated with a selector, can slow the movement of the spool and create the desired offset in the displacement change.

The selectors 150 illustrated in FIGS. 8 and 9 are electrically controlled. The assembly shown allows connecting them directly to a control module 130 which includes electric control outputs. The selectors shown include a return spring which creates a first, rest position in the absence of an electrical signal, and a second stable position when there is an electrical signal.

According to one variant embodiment, the spools 150 are controlled electrically, pneumatically or hydraulically to ensure offsets in time between the commutations of the spools 150 and consequently offsets in time between commutations of displacement of the different motors. To control the spools 150 by pneumatic or hydraulic controls, a pneumatic or hydraulic interface must be added between the housing 130 and the spools 150.

As a variant, it is possible to use a control module 130 with a single control output for changing displacement, but using selector spools 150 having a different time constant on each group of motors. This is equivalent to having a longer or shorter transient step, or a higher or lower rate of reaction of the spools 150.

Nevertheless, if it is desired to be able to control the change of displacement in an optimized manner, individual control of the displacement change spools 150 is preferred.

A person skilled in the art will understand, upon examining FIGS. 8 and 9, that in one stable position the two sub-motors 1200, 1210; 1220, 1230; 1400, 1410; 1420, 1430 of each motor 120, 122, 140, 142 are fed, and therefore the motors 120, 122, 140, 142 are at high displacement, while in the other stable position, only one of the sub-motors 1200; 1220; 1400; 1420 of each motor 120, 122, 140, 142 is fed, the other sub-motor 1210; 1230; 1410; 1430 of each motor 120, 122, 140, 142 being isolated from the circuit and not participating in locomotion, so that the motors 120, 122, 140, 142 are at small displacement.

The representation of the control spools 150 illustrated in the appended FIGS. 8 and 9 is only schematic. In practice, the constitution of the of the spools, their number of inlet and outlet ports and their number of positions, can vary provided that these spools ensure the aforementioned function of connecting in one position the elementary motors 1200, 1210; 1220, 1230; 1400, 1410; 1420, 1430 of each motor

120, 122, 140, 142 in parallel to supply a maximum displacement, and, on the contrary, in another position, isolating an elementary motor 1210; 1230; 1410; 1430 of the circuit to supply a small displacement.

The structure of multi-displacement motors controlled by a selector as shown schematically in FIGS. 8 and 9 is well known to a person skilled in the art. The Poclain company has marketed such motors for many years. Such a structure is in particular described in document FR 2 794 496. It will therefore not be described in more detail hereafter.

More precisely, within the scope of the present invention, hydraulic motors 120, 122, 140, 142 are preferably motors with radial pistons.

The applicant has already offered numerous models of such hydraulic machines with radial pistons. Examples of such machines will be found in particular in documents FR 2 796 992, FR 2 834 011, FR 2 834 012 and FR 2 587 761. Their structure will therefore not be described in detail hereafter.

Figure 10:
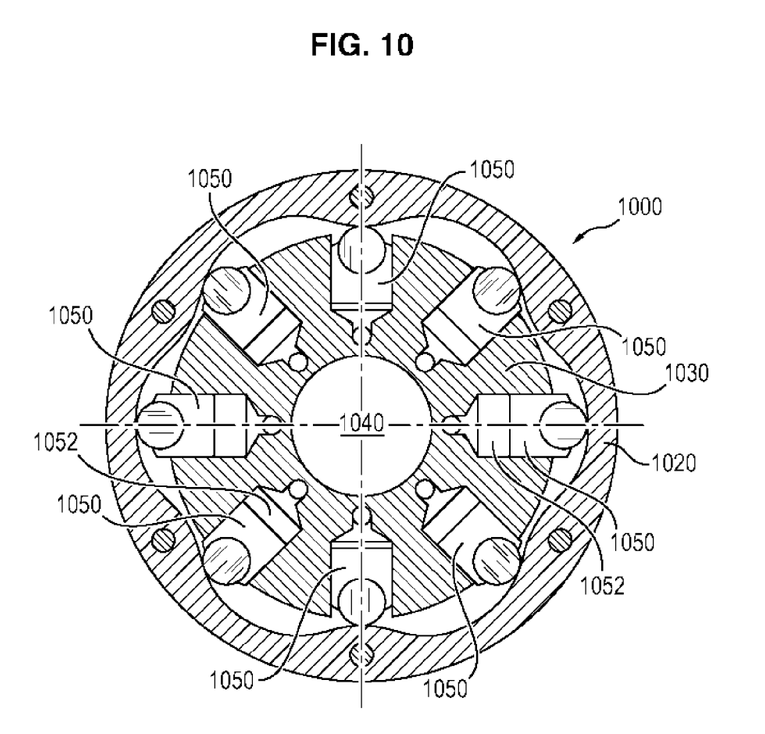
FIGS. 10 and 11 are schematic representations, respectively in a transverse section view and in a longitudinal section view, of motors with radial pistons used preferably in the scope of the present invention.
Figure 11:
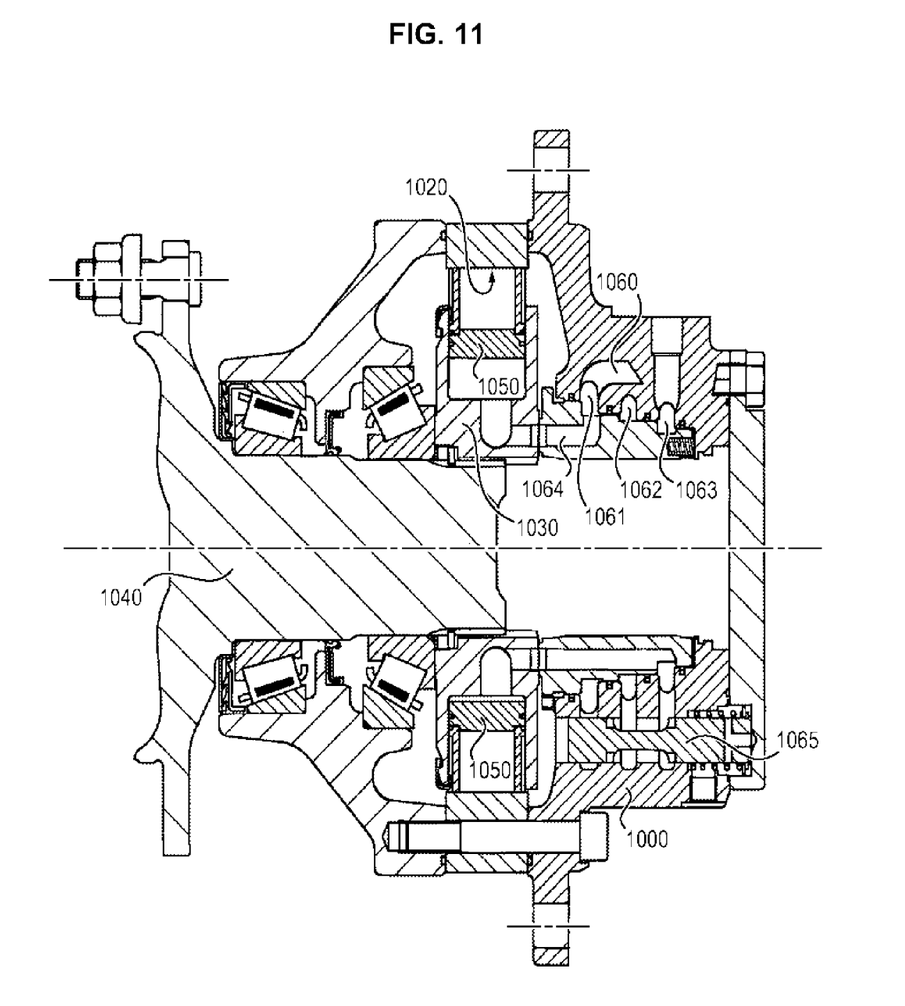

It will be recalled, however, that as shown in transverse section in FIG. 10 and in longitudinal section in FIG. 11 (which corresponds to FIG. 1 of FR 2 834 012), hydraulic machines with radial pistons general comprise in a casing 1000:

- a multi-lobed cam 1020 formed preferably on the internal surface of an element of the casing 1000,
- a cylinder block 1030 mounted in relative rotation in the casing,
- a shaft 1040 linked in rotation to the cylinder block 300,
- pistons 1050 guided in radial sliding in respective cylinders 1052 of the cylinder block and supported on the lobes of the cam 1020, and
- a distributor 1060 designed to apply successively, in a controlled manner, a fluid under pressure to the pistons 1050, so that the successive pressure of the pistons 1050 on the lobes of the cam 1020 drives the relative rotation of the cylinder block 1030 and the elements which are linked to it with respect to the casing.

Machines with radial pistons can however be subject to numerous variants. The multi-lobe cam can be formed, not on an internal surface of an element of the casing, but on an external surface of a shaft. The machines can have a fixed cam and a rotating shaft, or a fixed shaft and a rotating cam.

Furthermore, according to the appended FIG. 11, in conformity with the teaching of FR 2 834 012, the distributor 1060 includes for example three grooves 1061, 1062 and 1063 associated with respective distribution lines, such as 1064, leading to the face of the adjacent distributor of the cylinder block 1030 to control fluid supply and exhaust of the cylinders 1052, and a selector 1065 which, depending on its position, modifies the connection of the grooves 1061, 1062 and 1063 and thus allows the displacement of the machine to be controlled. A three-groove distributor can define a machine with two sub-displacements. The definition of each sub-displacement of the machine can be accomplished by groups of pistons or by groups of cam lobes.

Within the scope of the invention, the motors 120, 122, 140, 142 are generally and preferably at the speed of the wheels.

Of course, the present invention is not limited to the embodiments which have just been described, but extend to all variants in conformity with its spirit.

Within the scope of the invention, the offset in time of the change of displacement of the different motors can be controlled mechanically, and/or hydraulically, or even by software programming.

The invention claimed is:

1. A hydrostatic transmission system comprising:
   at least one pump,
   at least two wheel motors supplied by the pump for the mechanization of a machine,
   a control system designed to offset in time a change of displacement of the motors into several groups in order to have a progressive change in an apparent displacement of the motors, to avoid commuting two motors having received a change command at the same time, wherein said control system is designed to begin the change of displacement of the pump, offsetting in time a change of displacement of the motors into several groups so as to have a progressive evolution of the apparent displacement of the motors, and then to finish the change of displacement of the pump corresponding to the new displacement of the motors.

2. The system according to claim 1, wherein the control system designed to offset in time a change of displacement of the motors into several groups so as to obtain a progressive change in the apparent displacement of the motors, controls the change of the displacement of the motors during the time when the displacement of the pump is changed.

3. The system according to claim 1, wherein the decomposition of the displacement changes of the motors is accomplished by a successive change of displacement of the motors situated on either side of the machine.

4. The system according to claim 1, wherein each group of motors comprises a single motor.

5. The system according to claim 1, wherein each group of motors comprises several motors.

6. The system according to claim 1, wherein the control system controls a passage for an intermediate displacement of the circuit by controlling, in a manner differentiated in time, at least two selector spools.

7. The system according to claim 1, wherein the interval in which the change of displacement of the motors is accomplished, at a minimum, corresponds to the time necessary for the pump to accomplish the corresponding change of displacement.

8. The system according to claim 7, wherein the interval over which the change of displacement of the motors is accomplished is included in the time necessary for the pump, to accomplish the corresponding change of displacement.

9. The system according to claim 1, wherein the interval over which is accomplished the change of displacement of the motor corresponds to the time necessary for the control spools of the motors to change the cylinder of the motors.

10. The system according to claim 1, wherein the interval between two offsets of motor displacement is at least the time necessary for the pump and the motors for a change of displacement.

11. The system according to claim 1, wherein the motors are motors with cams and radial pistons.

12. The system according to claim 1, wherein the change of displacement is accomplished by software programming, a mechanical control or a hydraulic control.

13. A vehicle or machine including a hydrostatic transmission system conforming to claim 1.

14. A vehicle or machine including a hydrostatic transmission system implementing a method for controlling the displacement of motors according to claim 13.

15. The system according to claim 10, wherein the interval between two offsets of motor displacement is several times the time necessary for the pump for a change of displacement.

16. A control method for wheel motors implementing the system conforming to claim 1, comprising the steps of offsetting in time a change of displacement of the motors into several groups so as to have a progressive change in the apparent displacement of the motors, wherein said method comprises the steps of beginning the change of displacement of the pump, offsetting in time a change of displacement of the motors into several groups so as to have a progressive evolution of the apparent displacement of the motors, then finishing the change of displacement of the pump corresponding to the new displacement of the motors.

* * * * *